| United States Patent [19] | [11] Patent Number: 4,883,955
Kawasaki et al. | [45] Date of Patent: Nov. 28, 1989

[54] OPTICAL ENCODER WITH CONVERGING MEANS

[75] Inventors: Harumi Kawasaki; Masato Hara, both of Tokyo, Japan

[73] Assignee: Asahi Kogaku Kogyo K.K., Tokyo, Japan

[21] Appl. No.: 160,320

[22] Filed: Feb. 25, 1988

[30] Foreign Application Priority Data

Feb. 25, 1987 [JP] Japan .................. 62-42109

[51] Int. Cl.⁴ .............................................. G01D 5/34
[52] U.S. Cl. ............................ 250/231 SE; 250/237 G
[58] Field of Search ...................... 250/231 SE, 237 G; 356/373, 374, 395; 33/125 A, 125 C; 341/13, 11, 137

[56] References Cited

U.S. PATENT DOCUMENTS

| 3,487,399 | 12/1969 | Wogatzke | 341/13 |
| 3,950,099 | 4/1976 | Malueg | 250/231 SE |
| 4,112,295 | 9/1978 | Dubrik et al. | 250/237 G |
| 4,125,025 | 11/1978 | Suzuki et al. | 356/374 |
| 4,195,909 | 4/1980 | Holle et al. | 356/395 |
| 4,231,662 | 11/1980 | Feinland et al. | 356/373 |
| 4,385,234 | 5/1983 | Johnson | 250/231 SE |
| 4,519,709 | 5/1985 | Nelle | 356/373 |
| 4,631,404 | 12/1986 | Burkhardt et al. | 250/231 SE |
| 4,689,485 | 8/1987 | McMurtry | 250/231 SE |

FOREIGN PATENT DOCUMENTS 59-224516 12/1984 Japan .
6606623 11/1966 Netherlands .................. 356/395

Primary Examiner—David C. Nelms
Assistant Examiner—Michael Messinger
Attorney, Agent, or Firm—Sandler & Greenblum

[57] ABSTRACT

An optical encoder comprises a measuring section and a scanning grating plate. The measuring section comprises parallel light beam sources, light receiving elements located in opposition to the parallel light beam sources, converging devices disposed between the parallel light beam sources and the light receiving elements and a main grating plate arranged between the converging devices and the light receiving elements. The scanning grating plate is located between the main grating plate and the light receiving elements while allowing the scanning grating plate to move relative to the measuring section.

10 Claims, 11 Drawing Sheets

OPTICAL ENCODER WITH CONVERGING MEANS

BACKGROUND OF THE INVENTION

This invention relates to an optical encoder in which a grating plate and a scanning grating plate are located between a light source and a light receiving element for relative movement to each other to detect variations in luminous energy transmitted through the gratings due to relative displacement of the main grating plate and the scanning grating plate, to thereby measure the amount of the relative movement of the grating plates.

The above light-transmissive type optical encoder generally comprises a main grating plate and a scanning grating plate both with equally spaced gratings slits, which are located in parallel to each other between the light source and the light-receiving element for relative movement to each other. The light emitted from the light source is subject to changes due to relative displacement of the gratings formed on both the main grating plate and the scanning grating plate before reaching the light receiving element. The light receiving element then produces an electric signal of an approximate sine wave whose cycle coincides with the grating pitch in dependence on relative displacement of the gratings of the main and scanning grating plates. The measured value of relative movement of gratings the is given in the unit of grating pitch by counting the peak cycles of such an electric signal.

A rotary optical encoder of the above type, for example, is provided, between the light source and the light receiving element both of which are fixed in position, with a rotary grating plate (corresponding to the main grating plate mentioned above) with radially extending spaced grating slits and one or more scanning grating plate located adjacent the rotary grating plate in parallel therewith, which is inhibited from movement relative to the light source and the light receiving element.

As the rotary grating plate rotates, the luminous energy passed through the gratings of both grating plates varies in a cycle of grating pitch in response to relative positional displacement of these gratings. Varying luminous energy thus reaches the light receiving element which then produces an electric signal varying generally in the sine wave form with its cycle corresponding to the grating pitch. Such a signal varying in sine waveform is processed by a signal processing circuit to generate pulse signals. The angular position of the rotary grating plate is thus given in the unit of grating pitch by computing the pulse signals.

In such an optical encoder, measuring accuracy rises as the number of pulse signals produced for each relative movement of the main grating plate with respect to the scanning grating plate is increased. That is, the narrower the grating pitch on the grating plates, the better the acuracy in measuring the relative movement of the main and scanning grating plates would be.

It is also possible to measure the relative movement of the main and scanning grating plates with a higher accuracy than a given grating pitch by using pulse signals that are more fractionized than the grating pitch, utilizing a phase division technique for the sine wave signal detected by the light receiving element. To achieve this, the signal variation detected by the light receiving element (i.e., the variation in luminous energy reaching the light receiving element due to relative movement of the gratings) must be a correct sine wave in the cycle of the gratings pitch. With any waveform deviated from the correct sine wave, accurate phase division could not take place, resulting in a lowered accuracy in measuring the variation.

While a light beam can substantially be considered as linearly advancing when it passes through gratings with a rough pitch, the gratings begin to function as diffraction gratings so that the light passed through them will be subject to a diffraction effect, as the grating pitch is made finer to improve the measuring accuracy. In order to maintain a required measuring accuracy with no effect of such diffraction, the distance between the main grating plate and the scanning grating plate (grating distance) must be maintained within a very limited range of allowance. Specifically, the light passed through the grating plate is subject to a diffraction effect which is known as Fresnel diffraciton in terms of optics to provide a diffraction light having more than one peak with respect to the distance from the main grating plate (light and darkness alternately appear at the same pitch as the grating of the main grating plate depending on the distance from the main grating plate). The location of such peaks depends on the grating pitch and the wavelength of the light passed therethrough. The position of the scanning grating plate with respect to the main grating plate (distance between the main grating plate and the scanning grating plate) is preferably made coincident with the location of the peaks of the Fresnel diffracion light formed by the grating of the main grating plate and is usually set at the first peak of the Fresnel diffraction light.

With the scanning grating plate located at the first peak accordingly, the following difficulties may be encountered, if there is a locational error of the grating plate.

With an increased grating distance, the direct current component of a detected signal rises to lower contrast in signal, resulting in a degraded S/N ratio. This adversely affects the accuracy in converting the detected signal to pulse signals and therefore the entire measuring accuracy.

Too small a grating distance, on the other hand, will cause a harmonic distortion of the detected signal to increase (the waveform of the detected signal approximates a rectangular wave rather than a sine wave), so that accuracy in phase division is degraded to again lower the measuring accuracy as a whole.

Thus, in order to obtain a well-defined sine waveform, the grating distance must be maintained within a very narrow range of values. Also, there may be errors in measurement due to variation in surface evenness as well as varying grating distance due to relative movement of the main grating plate and scanning grating plate. Consequently, significant precision is required for fabricating components and their assembly and adjustment, resulting in higher manufacturing costs. Particularly in a rotary encoder, even eccentricity of the rotary grating plate causes measuring errors, requiring a far greater precision in manufacturing and adjusting its rotary mechanism.

Also, the grating distance must be diminished with a finer grating pitch (e.g., assuming grating pitch to be 8 $\mu$m and the wavelength $\lambda$ of light to be 0.95 $\mu$m, the grating distance should be d=60 $\mu$m). Because dust allowed into such a narrow grating distance may damage the grating surface to deteriorate the signal, a necessary dust protecting means further pushes up the manufacturing cost.

Furthermore, since the Fresnel diffraction image is formed periodically for each of the grating pitches of both grating plates, the cycle of the sine wave signal fluctuates depending on the location of the main grating plate, if there is an error in grating slit width or grating pitch in each grating plate. This also makes it difficult to provide uniform measuring accuracy.

SUMMARY OF THE INVENTION

It is therefore an object of the invention to provide an improved optical encoder which is less vulnerable to a rather rough setting of grating distance as well as a relative movement of grating plates, and therefore ensures more accurate measurement even with a relatively low accuracy in movement, while making provision of dust protecting means easier because of a greater grating distance.

For the above purpose, according to the invention, there is provided an optical encoder comprising:

a measuring section which comprises:
   parallel light beam generating means,
   light receiving means located in opposition to said parallel light beam generating means,
   converging means disposed between said parallel light beam generating means and said light receiving means, and
   main grating means arranged between said converging means and said light receiving means; and
scanning grating means located between said main grating means and said light receiving means, said scanning grating means being movable relative to said measuring section.

With the above constructed optical encoder, the diffraction light is formed by the main grating means on the plane whereon the light is converged by said converging means, and the resultant luminous energy of the diffraction light transmitted through the scanning grating means is converted to an electric signal by the light receiving means. The relative movement of the main grating means and the scanning grating means is measured by counting the variation of the electric signal responsive to the relative displacement of main and scanning grating means.

DESCRIPTION OF THE ACCOMPANYING DRAWINGS

DESCRIPTION OF THE EMBODIMENTS

Figure 1:
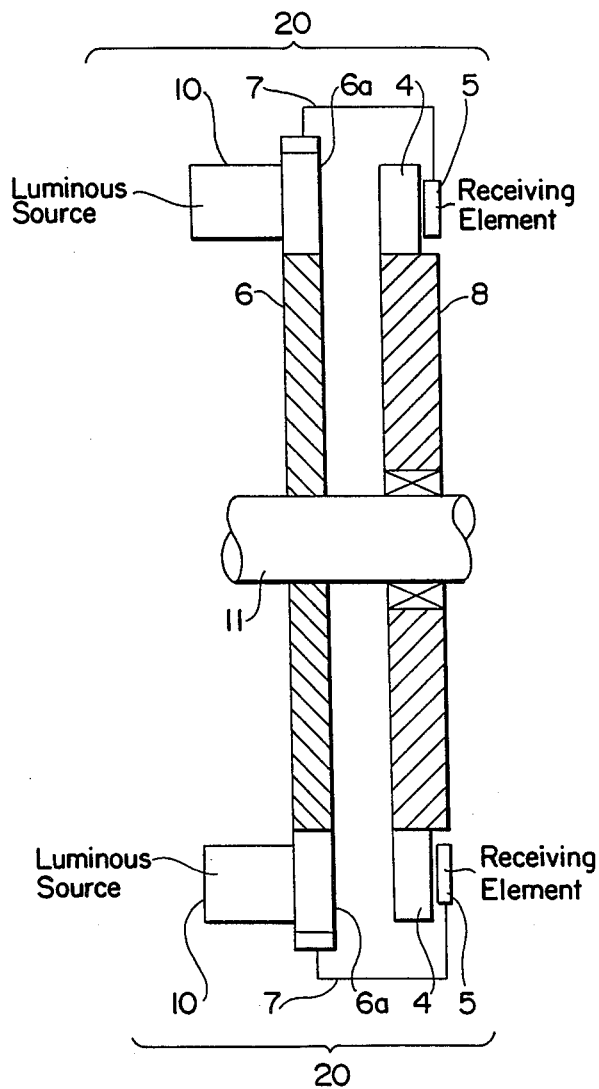
FIG. 1 is a schematic structural diagram showing an optical encoder embodying the invention.
Figure 2:
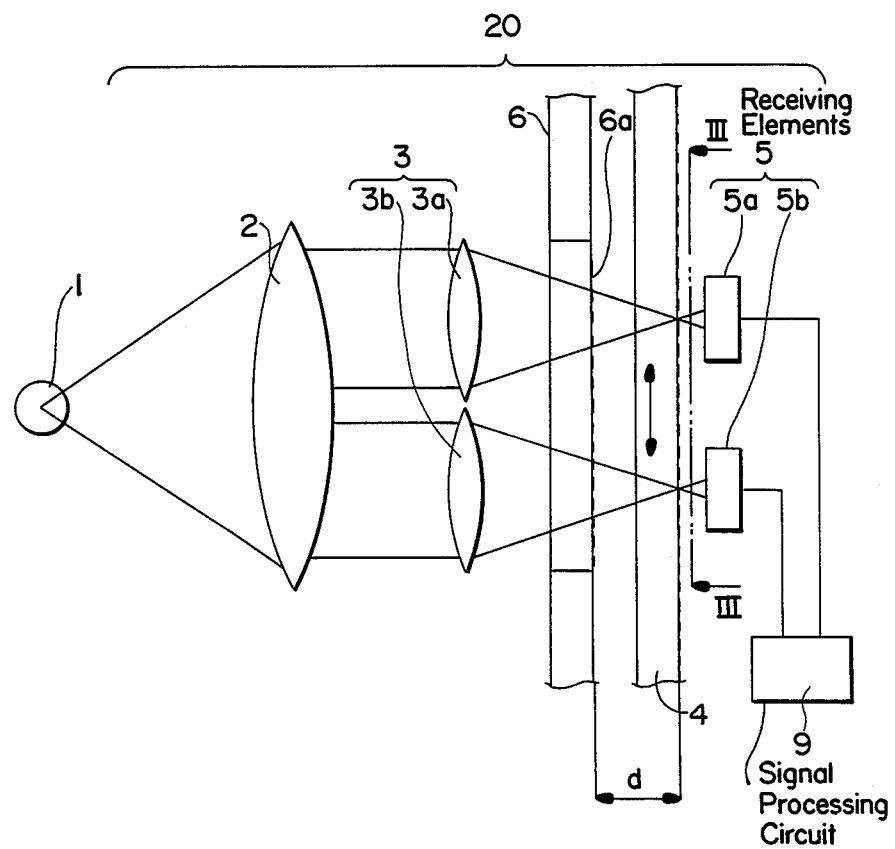
FIG. 2 is a schematic view of its measuring section.
Figure 3:
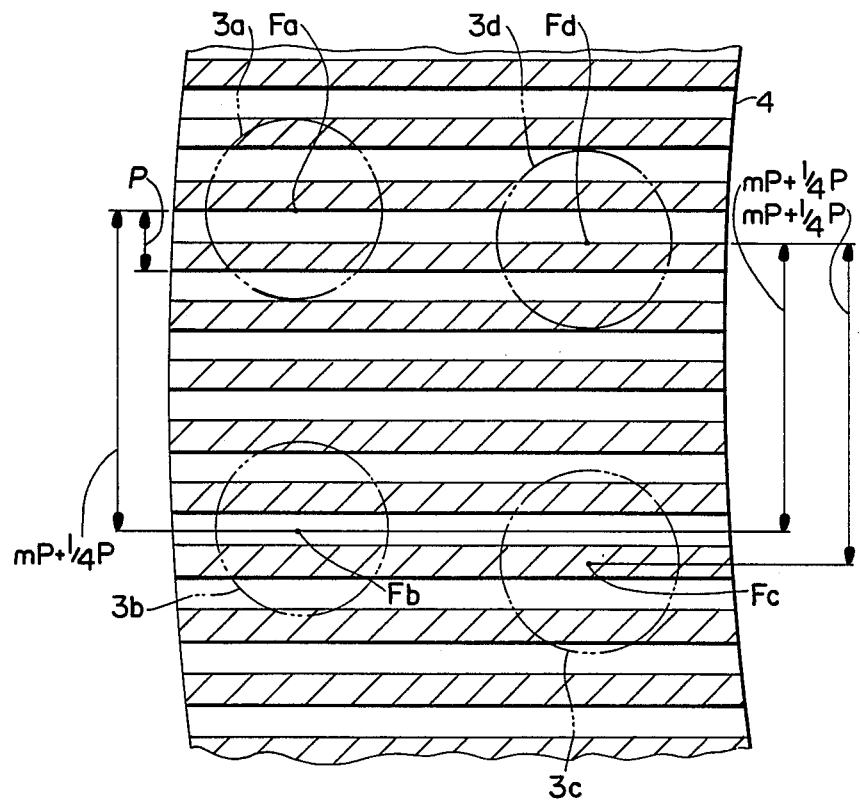
FIG. 3 is a section taken along the line III—III of FIG. 2.

FIG. 1 is a schematic structural view of a rotary encoder embodying the invention and FIGS. 2 and 3 show details of its measuring section and its measuring principle.

Referring first to FIG. 1, numeral 6 indicates a main grating plate, 8 a scanning plate mounted for relative rotation to the main grating plate 6, and 10, 10 are luminous sources secured to the main grating plate 6.

The main grating plate 6 is provided with a pair of diffraction gratings 6a, 6a serving as the main grating means symmetrically arranged about a shaft 11 which is secured to the main grating plate 6.

Each of the pair of luminmous sources 10, 10 is fixedly mounted at the position opposing to each of the diffraction grating 6a of the main grating plate 6 for emitting light toward the corresponding diffraction grating 6a.

A pair of light receiving elements 5, 5 serving as the light receiving means are arranged opposite to the luminous sources 10, 10 across the diffraction gratings 6a, 6a of the main grating plate 6, and are supported by a pair of arms 7, 7 fixed to the main grating plate 6.

A scanning plate 8 is arranged between the main grating plate 6 and the light receiving elements 5, 5, while allowing the scanning plate 8 to move (rotate) in the direction crossing the direction of slits of the grating 6a relative to the main grating plate 6 and the light receiving elements 5, 5.

The scanning plate 8 is the disc plate having formed thereon a scanning grating 4 composed of slits with predetermined pitch and radially extending from the center of the scanning plate 8. The direction of the slits of the scanning grating 4 is parallel with that of the main grating plate 6. The scanning plate 8 is relatively rotatably mounted on the shaft 11 with respect to the main grating plate 6.

The measuring section 20 is thus constituted by the luminous sources 10, 10, the diffraction gratings 6a, 6a and light receiving elements 5, 5, while the scanning grating 4 is relatively rotatably arranged between the diffraction gratings 6a, 6a and the light receiving elements 5, 5.

The light emitted from each light source 10 is diffracted through the diffraction grating 6a of the main grating plate 6 and is then passed through the scanning plate 4 to reach the corresponding one of the light receiving elements 5 to be converted to an electric signal responsive to the incident light.

The electric signal generated by each light receiving element 5 is sent to the signal processing circuit 9 which then detects and computes the variation in luminous energy of incident light caused by relative displacement of the diffraction gratings 6a, 6a and the scanning grating 4, thus providing a measured value of angular displacement of the main grating plate 6 and the scanning grating 4 (i.e., the scanning plate 8) relative to each other.

The measuring principle with the measuring section 20 and the scanning grating 4 will now be explained with reference to FIGS. 2 and 3.

The luminous source unit 10 consists of of LEDs (light emitting diodes) 1, a collimator lens 2 and four condenser lenses 3 (3a, 3b, 3c, and 3d) placed along the path of outgoing light. The light emitted from LEDs 1 forms a parallel light beam by the collimator lens 2. Four condenser lenses 3 with the same focal length are placed in parallel to one another within the parallel light beam provided by the collimator lens 2 with their focal points located on planes at an equal distance from the lenses 3. Thus, the condenser lenses 3 serve as the converging means while the LEDs 1 and the collimator lens 2 serve as the parallel light beam generating means.

The grating plane of the scanning grating 4 is positioned at the focal points F (Fa, Fb, Fc, Fd) of the condenser lenses 3 at which the light-rays coming from the luminous sources 10, 10 meet.

The optical axes of the condenser lenses 3 are set to be out of alignment each by ¼ pitch of the grating pitch of the scanning grating 4. That is, assume the condenser lenses 3 are arranged in parallel in the direction of scanning the grating, i.e., the direction crossing the slit-direction of the grating, the distance between respective optical axes of the condenser lenses 3 becomes, as shown in FIG. 3:

$$nP + \tfrac{1}{4}P$$

where P is a grating pitch of the scanning grating 4 and n is an integer.

Figure 16:
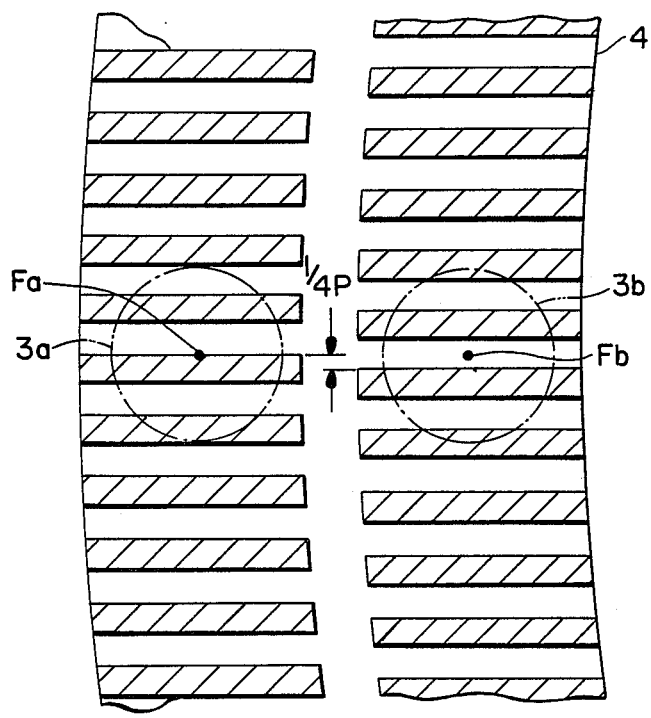
FIG. 16 shows a relationship between optical paths of the condenser lenses and the scanning grating.

As illustrated in FIG. 16 where two condenser lenses 3 are used, the condenser lenses 3 may alternatively be arranged on a line parallel with the slit direction of the scanning grating 4 while the slits on the respective focal points of the condenser lenses 3 are formed to be out of alignment each by a ¼ pitch. These two ways arranging the condenser lenses 3 and the scanning grating 4 may of course be adopted in combination.

The light-receiving element 5 (5a, 5b, 5c, 5d) is fixedly mounted on the side of each scanning grating 4 opposite to the light incident side thereof while being supported by the arms 7 secured to the main grating plate 6 as mentioned above.

The main grating plate 6 is arranged between the condenser lenses 3 and the focal points thereof, i.e., the grating plane on the scanning grating 4, with a predetermined distance d from the scanning grating 4.

The measuring section 20 is thus constituted by the LEDs 1, collimator lens 2, condenser lenses 3, the main grating plate 6 and light receiving elements 5, 5 secured together against relative movement to each other, and the scanning grating 4 is relatively rotatable in the direction crossing the slit direction thereof with respect to the above constituted measuring section 20.

The light-rays emitted from LEDs 1, which form the parallel light beam by means of the collimator lens 2, then converge at the grating plane on the scanning grating 4 by means of the condenser lens 3. The converged light-rays are diffracted at the diffraction grating 6a of the main grating plate 6 when passing therethrough. This diffraction develops a Fraunhofer diffraction image at the grating plane on the scanning grating 4 with its grating pitch inconsistent with that of the diffraction grating 6a.

With the arrangements as described above, the luminous energy of the Fraunhofer diffraction image, produced at the diffraction grating 6a of the main grating plate 6 and passed through the scanning grating 4 spaced at d from the main grating plate 6, is converted to an electric signal by the light receiving element 5. A relative angular displacement of the Fraunhofer diffraction image and the scanning grating 4 is thus given by detecting variation in luminous energy of the light (i.e., the Fraunhofer diffraction image) inputted into the light receiving element 5.

Now, the way a relative locational relation between the individual components can be calculated is described in terms of actual values so as to implement the above described measurement.

Figure 4:
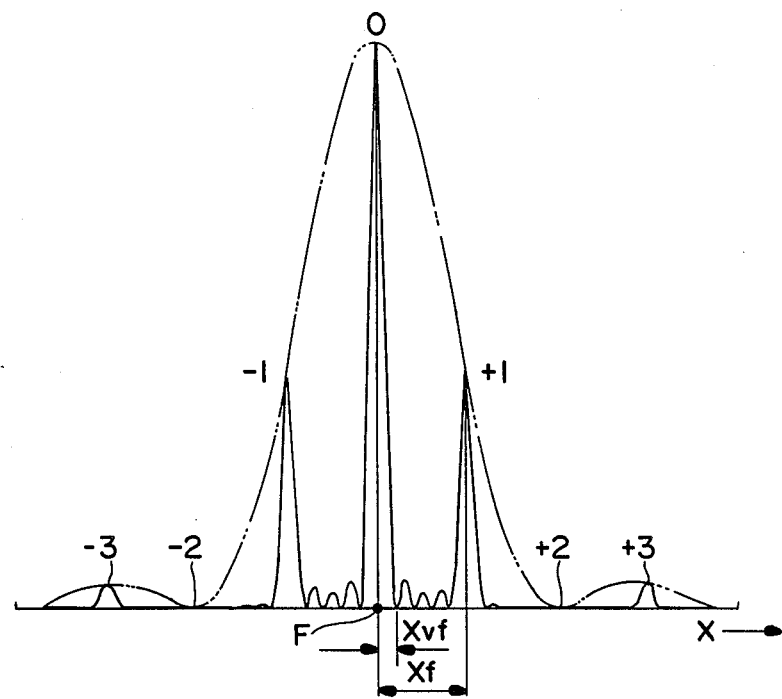
FIG. 4 is a diagram showing a luminous energy distribution of a Fraunhofer diffraction image.

Assume:
λ: Wavelength of luminous light from LEDs 1
2a: Slit width of rotary grating
p (=4a): Grating pitch
m+1: Number of gratings within the illumination visibility
d: Grating distance, multiple high peaks of the Fraunhofer diffraction image produced at the focal point of the condenser lens 3 by means of the diffraction grating 6a appear at every distance $$Xf = \lambda d/p$$

from the focal point F according to the optical principle of Fraunhofer diffraction. These are diffraction light spots appearing at the stages of o, +/−1, +/−2, +/−3, and +/−g across the center Fa (See FIG. 4 showing an illustrative diagam).

There are m small peaks emerging between the diffraction lignt spots at every $$Xvf = \lambda d/(m+1)P$$

The center diffraction spot at stage O (in the vicinity) is then scanned by the scanning grating 4.

In order to provide a sine scanning wave, the grating distance d is so detremined that the width of the spot at O stage of the Fraunhofer image developed by equal to the slit width 2a.

That is, the grating distance d is set to $$d = (m+1)p\, a/\lambda$$

where
λ: 0.95(μm)
2a: 5(μm)
p: 10(μm)
m+1: 401 (lines)
The resultant calculation gives $$d = 10.6 \text{ (mm)}$$

Figure 5:
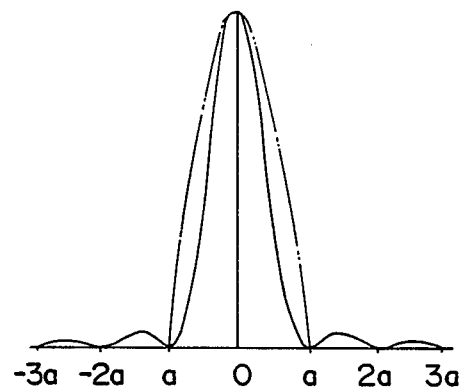
FIGS. 5 and 8 are diagrams showing luminous energy distribution of a diffraction image.
Figure 7:
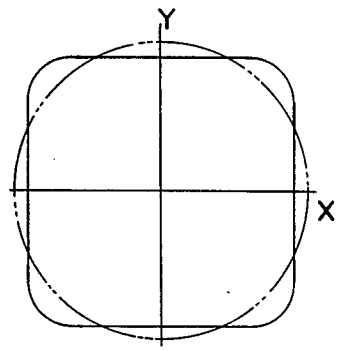
FIGS. 7 and 10 are Lissajous figures of luminous energy distribution of a diffraction image.
Figure 8:
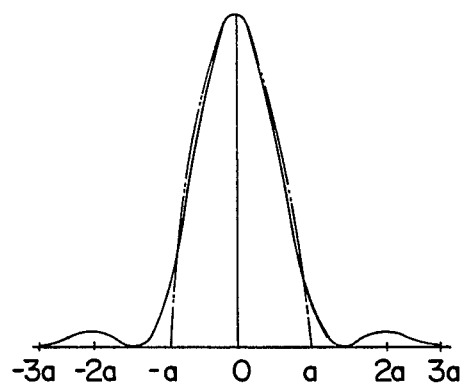
Figure 9:
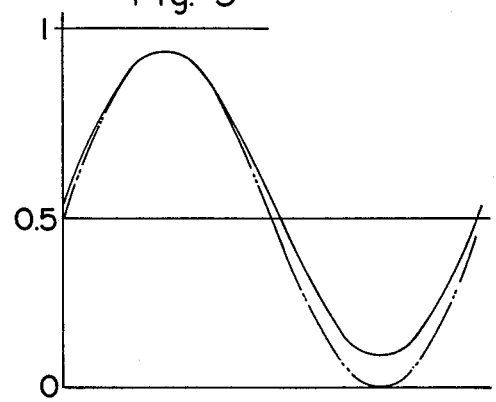
Figure 10:
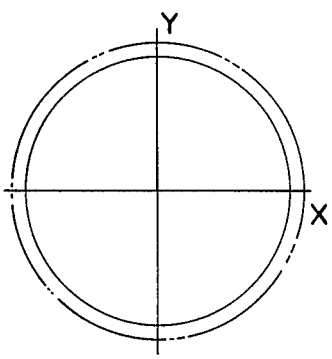

FIGS. 5 and 7 show the diffraction light distribution, scanning waveforms and its Lissajous firgure obtained by computer simulation.

In FIG. 5, the minimal peak value of the diffraction image within the scope of |X|>3a is only 2% of the center peak value or less and can be regarded as a value that is not involved in a scanning signal. Therefore, the light receiving area on the light receiving element 5 is to be set such that the number of slits on the scanning grating 4 falling into the light receiving area of the light receiving element 5 (which serves for scanning) is to be three or four.

This is a significant difference from the conventional scanning system for Fresnel diffraction light where the scanning range of the grating covers the whole area of illumination visibility to detect variation in light and darkness over its whole range.

Figure 6:
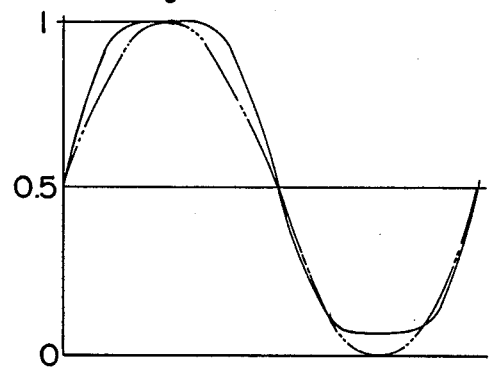
FIGS. 6 and 9 show waveforms of scanned data.

FIG. 6 show a scanning signal of sine waveform, which is detected at focal point Fa of FIG. 3 by means of the light receiving element 5. On the other hand, another scanning signal of cosine waveform with its phase differing by 90 degrees from that of the sine wave signal is detected at the focal point Fb of the condenser lens 3, the optical axis of which is misaligned by a ¼ of the grating pitch of the scanning grating 4.

Both signals are applied to the X-axis and Y-axis to provide a Lissajous figure indicated by the solid line in FIG. 7.

As shown in FIG. 6, the scanning signal is associated with much harmonic distortion, so that the Lissajous figure in a FIG. 7 is nearly a square rather than a circle (the Lissajous figure approximates a circle with less distortion). Suppose here that distortion Ds=11.5 (%) and visibility V=0.98.

Now the grating distance d has been varied to calculate its optimum value to provids the best distribution of diffraction image, scanning waveform and Lissajous figure. As a result, a generally satisfactory value has been given with a minimum distortion providing a nearly circular Lissajous figure.

Figure 11:
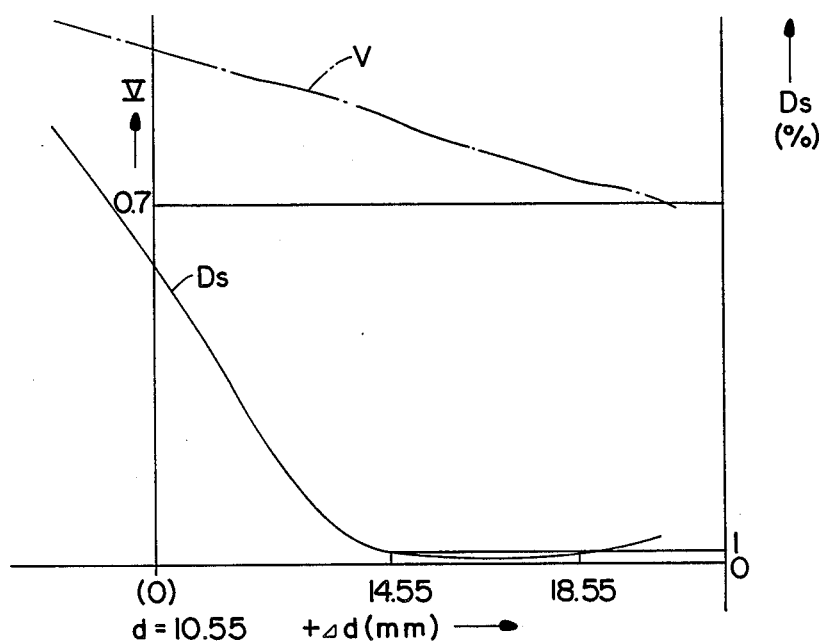
FIG. 11 is a graph showing visibility and distortion curves with respect to the grating distance.

In this case, d=15.55 (mm), V=0.83, Ds=0.22 (%). FIG. 11 is a graph showing the relationship of visibility V and distortion Ds with respect to the grating destance d. The allowance of d can be given based on the allowance of measured angles of V and Ds shown in this graph.

Assuming the measued angle allowance to be V>0.7 and Ds<1 (%), d=16.55+/−2 (mm).

This value of grating distance and its allowance is remarkably greater than those with conventional Fresnel diffraction image scanning systems.

While the grating plane on the scanning grating 4 has been presumed to fall exactly upon the focal point of the condenser lens 3 in the foregoing example, let us check to see how a deviation from the facal point would affect the calculation result.

Figure 12:
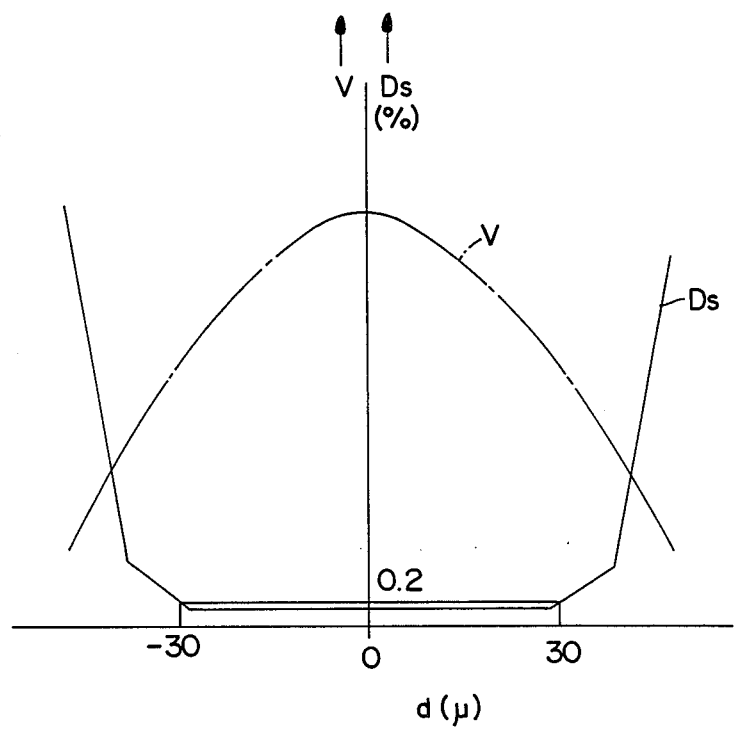
FIG. 12 is a graph showing visibility and distortion curves with respect to the location error of a scanning grating.

FIG. 12 is a graph showing the relationship of visibility V and distortion Ds with repect to the deviation <d (μm). The allowance of Δd can be given from the allowance of measured angles of V and Ds shown in this graph.

Suppose that the allowable limit is Ds<0.2%, the locational deviation of the scanning grating will be |Δd|≧30 (μm).

It is demonstrated by the known electronic circuit technology that although V drops parabolically, such a drop of value V would not largely affect the accuracy in measured angles, so long as the distortion Ds is small enough to provide a nearly circular Lissajous figure.

The scanning signal received from the respective light receiving elements 5 is corrected to a pair of scanning signals of sine and cosine waveforms by a signal correction stage 30 of the signal processing circuit 9, with their direct current component canceled. Their phases are subdivided to provide intermediate angles.

The encoder is usually structured to produce a scanning signal of sine wave and another one of cosine wave whose phase is 90 degrees different from that of the first scanning signal. It is therefore generally possible to subdivided the phase of these signals to detect intermediate angles.

Therefore, theoretically, only two pairs of the condenser lens 3 and the light receiving elements 5 could be basically sufficient, the optical paths of the condenser lenses 3 being misaligned by the ¼ of the grating pitch of the scanning grating 4. But in this embodiment, four condenser lenses 3, the optical paths of which are misaligned respectively by the ¼ of the grating pitch of the scanning grating 4, and the corresponding light receiving elements 5 opposingly arranged thereto are provided to detect signals with their phases different by 90 degrees from one another, whereby the following calculation allows correction of the direct-current component of the signals.

Assume the scanning signal received by the light receiving element 5 via corresponding scanning grating 4 to be Si (i=1−4), its direct-current component to be a and its signal amplitude to be bi (i=−1−4), the signal Si is represented by $$Si = a + b_i \sin[c.x + (i-1)/\pi]$$

Where a, b, c are constant.
From this formula, $$S_1 + S_3 = (b_1 + b_3) \sin(c.x)$$

$$S_2 + S_4 = (b_2 + b_4) \cos(c.x)$$

are given to cancel their direct-current components, thus providing a pair of sine wave and cosine wave signals.

The resultant pair of sine wave and cosine wave scanning signals are subject to phase division to provide measurement of minute angles.

The interpolation technique for fractionizing phases from a pair of scanning signals may be optical or electronic. Although it is known, the method of fractionizing phases using resistance dividing is breifly discribed below.

Figure 13:
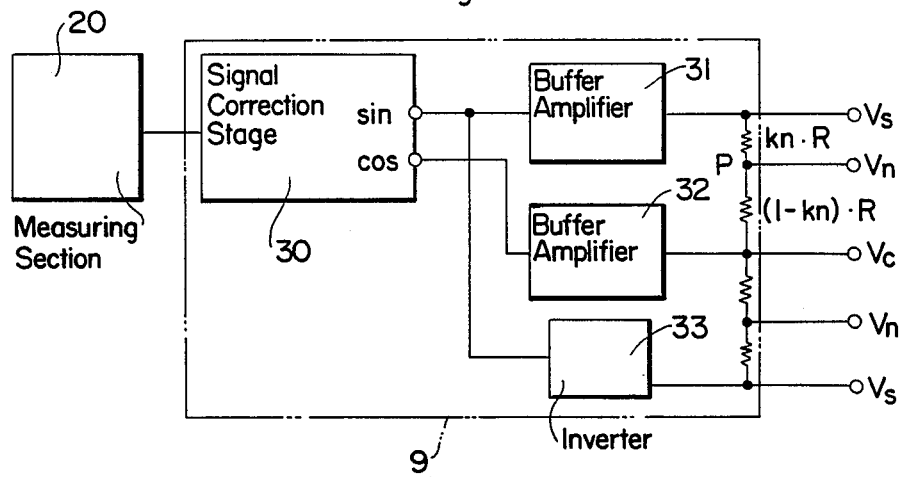
FIG. 13 is a circuit diagram to derive phase difference signals from the phase of scanning signals.

As shown in FIG. 13, the sine and cosine wave signals with their phase shifted through 90 degrees are sent from the signal correction stage 30 and are fed to both ends of a bleeder resistor by way of buffer amplifiers 31, 32. Also, the sine signal is subject to phase inversion at an inverter 33. The phase-inverted signal is fed to another bleeder resistor together with the output of the buffer amplifier 32.

Figure 14:
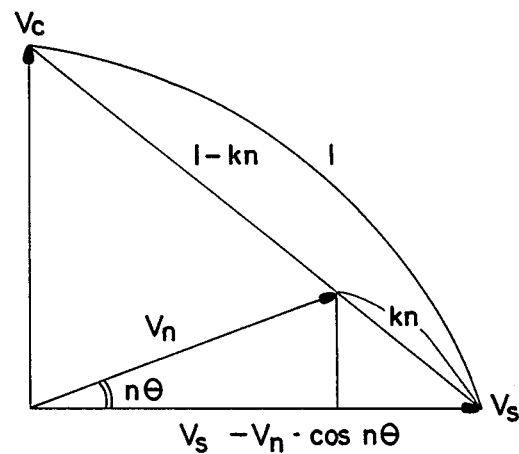
FIG. 14 is a vector diagram of resistance dividing.

Now, the phase difference signal derived from the middle point P of bleeder resistors is Vn shown in the vector diagram of FIG. 14 so that a phase diffrence signal at a desired angle θ can be obtained by varying the ratio kn of dividing resistance.

Figure 15:
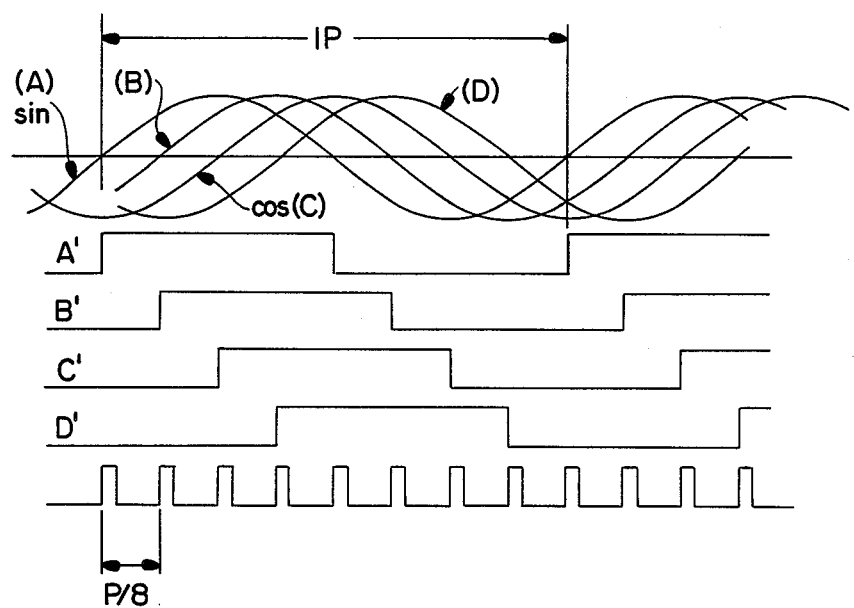
FIG. 15 shows waveforms of divided signals.

As a result, multiple signals (A, B, C, D) with a desired phase difference are available as shown in FIG. 15. After being shaped to waveforms (A', B', C', D'), their leading and trailing edges are converted to pulses to be counted. This is the way measurement is done with an enhanced resolution at a more fractionized grating pitch (⅛ pitch in this example).

As is recognized, two measuring sections 20 and 20 are placed in two separate positions symmetrically about the center of the scanning plate 8. The reason for this is to cancel the measuring error in the form of sine a wave with its one cycle equal to one rotation (360 degrees) of the scanning plate 8 when it is eccentrically rotated with respect to the main grating plate 6.

While in this embodiment, the measuring section 20, 20 are fixed to allow the scanning plate 8 to rotate relative thereto, the scanning plate 8 may alternately be fixed against rotation with the measuring section 20 being rotatable.

Furthermore, while this embodiment discloses a rotary encoder, the invention is obviously applicable to a linear encoder in which the scanning plate is formed to be linear and the measuring section moves along the linear scanning plate (or vice versa).

With the above described optical encoder embodying the invention, the Fraunhofer diffraction image developed by the diffraction gratings reaches the light receiving element while it is scanned by the scanning grating, so that the distance between the diffration gratings and the scanning grating can be kept relatively wide, with a greater allowance (range) of locational accuracy.

Thus, a required measuring precision is available with lower accuracy in manfacturing and assembling components, thereby materially cutting down the manufacturing cost.

Further, because of a wider grating distance, it is less affected by dust and foreign material, resulting in improved durability with a simpler dust protecting means.

In additon, a higher measuring accuracy which has been difficult in the prior art because of limited mechanical precision in manufacturing and assembly can be obtained.

What is claimed is:

1. An optical encoder comprising:
    a measuring section which comprises:
        parallel light beam generating means,
        light receiving means located in opposition to said parallel light beam generating means,
        converging means disposed between said parallel light beam generating means and said light receiving means for converging the parallel light beam to a focal point on a focal plane, and
        main grating means arranged between said converging means and said light receiving means; and
        scanning grating means located between said main grating means and said light receiving means and on the focal plane of said converging means said scanning grating means being movable relative to said measuring section 2. The optical encoder according to claim 1, wherein said measuring section is fixedly arranged while said scanning grating means is movable.

3. The optical encoder according to claim 1, wherein said scanning grating means is fixedly arranged while said measuring section is movable.

4. The optical encoder according to claim 1, wherein said converging means comprises at least two condenser lenses placed in parallel within the parallel light beam coming from said parallel light beam generating means while the optical paths of said condenser lenses being misaligned with respect to said scanning grating means by $\frac{1}{4}$ of the grating pitch of said scanning grating means, and wherein said light receiving means comprises a number of light receiving elements corresponding to the number of said condenser lenses.

5. The optical encoder according to claim 1, wherein said converging means comprises at least two condenser lenses placed in parallel within the parallel light beam coming from said parallel light beam generating means, and said scanning grating means comprises a grating plate provided with gratings, the slits of which being from misaligned each other by a $\frac{1}{4}$ pitch at the respective focal points of said condenser lenses, and wherein said light receiving means comprises a number of light receiving elements corresponding to the number of said condenser lenses.

6. The optical encoder according to claim 4, wherein said coverging means comprises four condenser lenses.

7. The optical encoder according to claim 1, wherein said scanning grating means comprises a disc-shaped grating plate with radially extending gratings thereon, and the movement of said scanning grating means relative to the measuring section is a rotary movement.

8. The optical encoder according to claim 1, wherein more than one of said measuring section are provided for one of said scanning grating means.

9. The optical encoder according to claim 7, wherein two of said measuring sections are provided in two separate positions symmetrically about the rotary center of said relative rotation of said measuring sections and said scanning grating plate.

10. The optical encoder according to claim 1, wherein said scanning grating means includes a grating plane, said grating plane being located in said focal plane of said converging means.

* * * * *